United States Patent Office 2,958,624
Patented Nov. 1, 1960

2,958,624
METHOD OF CONTROLLING INSECT AND FUNGI COMPRISING CONTACTING WITH A 1,4-DIFORMYL-2,5-DIMETHYL PIPERAZINE

Russell M. Bimber, Painesville, Ohio, assignor to Diamond Alkali Company, Cleveland, Ohio, a corporation of Delaware No Drawing. Filed Apr. 30, 1958, Ser. No. 731,877

3 Claims. (Cl. 167—33)

The present invention relates to novel compounds represented by the structure:

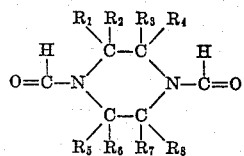

wherein $R_1$, $R_2$, $R_3$, $R_4$, $R_5$, $R_6$, $R_7$ and $R_8$ are selected from the group consisting of hydrogen atoms; alkyl radicals, such as methyl, ethyl, propyl, butyl, octyl and the like, preferably lower alkyl radicals; aralkyl radicals, e.g., benzyl and phenethyl radicals; halogen atoms, i.e., chlorine, fluorine, bromine, and iodine; and substituted derivatives of these radicals, such R radicals preferably having no more than 30 carbon atoms, and to the preparation and application of such compounds.

Specific illustrative compounds within the scope of this invention are 1,4-diformyl-2-substituted-piperazine such as:

1,4-diformyl-2-methyl piperazine
1,4-diformyl-2-ethyl piperazine
1,4-diformyl-2-chloro piperazine
1,4-diformyl-2-octyl piperazine
1,4-diformyl-2-propyl piperazine
1,4-diformyl-2-phenethyl piperazine
1,4-diformyl-2,5-disubstituted piperazines such as 1,4-diformyl-2,5-dimethyl piperazine, 1,4-diformyl-2,5-diethyl piperazine, 1,4-diformyl-2,5-dibromo piperazine, 1,4-diformyl-2,5-dichloro piperazine, 1,4-diformyl-2-dioctyl piperazine, 1,4-diformyl-2,5-dipropyl piperazine, 1,4-diformyl-2,5-diphenethyl piperazine Especially preferred of the above are 1,4-diformyl-dialkyl piperazines, specifically 1,4-diformyl-2,5-dimethyl piperazine.

Compounds of this invention may be prepared by chemically reacting a substituted piperazine of the structure:

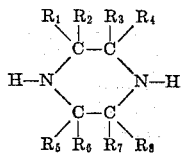

with chloral, the compound chloral as employed in the specification and claims being intended to refer to chloral hydrate as well as chloral, wherein $R_1$, $R_2$, $R_3$, $R_4$, $R_5$, $R_6$, $R_7$ and $R_8$ are selected from the group consisting of hydrogen atoms; alkyl radicals, such as methyl, ethyl, propyl, butyl, octyl and the like, preferably lower alkyl radicals; aralkyl radicals, e.g., benzyl and phenethyl radicals; halogen atoms, i.e., fluorine, chlorine, bromine and iodine; and substituted derivatives of radicals, such radicals preferably having no more than 30 carbon atoms.

It is to be understood that a compound represented by the structure:

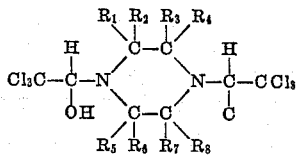

wherein $R_1$, $R_2$, $R_3$, $R_4$, $R_5$, $R_6$, $R_7$ and $R_8$ are, as previously defined, formed as an intermediate in the above reaction.

Preferred compounds of this invention, i.e., 1,4-diformyl-2-substituted piperazines and 1,4-diformyl-2,5-disubstituted piperazines, are prepared by chemically reacting chloral with the respective substituted piperazines, e.g., the 1,4-diformyl-2-substituted piperazines being prepared by chemically reacting chloral with 2-substituted piperazine such as:

2-methyl piperazine
2-ethyl piperazine
2-chloro piperazine
2-octyl piperazine
2-propyl piperazine
2-phenethyl piperazine and the 1,4-diformyl-2,5-disubstituted piperazines being prepared by chemically reacting chloral with 2,5-disubstituted piperazine such as:

2,5-dimethyl piperazine
2,5-diethyl piperazine
2,5-dibromo piperazine
2,5-dichloro piperazine
2,5-dioctyl piperazine
2,5-dipropyl piperazine
2,5-diphenethyl piperazine The especially preferred 1,4-diformyl-2,5-dialkyl piperazines may be prepared by chemically reacting chloral with a dialkyl substituted piperazine, e.g., the 1,4-diformyl-2,5-dimethyl piperazine being prepared by chemically reacting chloral with 2,5-dimethyl piperazine.

Typically, the above-indicated preparations are carried out at a temperature below the decomposition temperature of the reactants, e.g., at a temperature up to the reflux temperature of chloral, preferably at a temperature within the range from 0° to 50° C. In general it is preferred to employ substantially stoichiometric ratios of the reactants. However, considerable departure from these ratios can be tolerated in many instances without serious detriment to either yields or quality of product.

The reaction is typically carried to completion in a relatively short time, e.g., generally less than about 1 hour, and in certain instances, reaction may be more easily effected by employing a solvent such as water or an organic solvent such as hydrocarbon solvents, e.g., hexane, benzene, heptane; a chlorinated solvent, e.g., carbon tetrachloride, trichlorobenzene, chloroform. Purification as desired can be effected by extraction and crystallization, e.g., from chloroform, carbon tetrachloride, and/or ethyl acetate.

The compounds of this invention may be employed in a variety of applications biological or otherwise, such as insecticides, aphicides, fungicides, anti-histiminic agents, anti-spasmodic agents, antifoaming agents, and also as chemical intermediates. It will be understood, of course, that such compounds may be utilized in diverse formulations, both liquid and solid, including finely-divided powders and granular materials, solutions, concentrates, emulsifiable concentrates, slurries and the like depending upon the application intended and the formulation medium desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina-silica materials and incorporating liquid solvents, diluents, etc., typically water and various organic liquids, such as kerosene, benzene, toluene, cyclohexanone and other petroleum distillate fractions or mixtures thereof.

When liquid formulations are employed, or dry materials prepared which are to be used in liquid form, it is desirable in certain instances to additionally employ a wetting, emulsifying or dispersing agent to facilitate use of the formulation, suitable surface active agents being set out for example in an article by John W. McCutcheon in Soap and Chemical Specialities, vol. 31, Nos. 7–10 (1955).

The term "carrier" as employed in the specification and claims is intended to refer broadly to the materials constituting a major proportion of a biologically active or other formulation, and hence includes finely-divided materials both liquids and solids as aforementioned conventionally used in such applications.

The present invention may also be used alone or in combination with other known biologically active materials, such as halo polyhydrothiophene-1,1-dioxides, chlorinated hydrocarbons, organic phosphorous compounds, foliage and soil fungicides, pre- and post-emergent herbicides and the like.

In order that those skilled in the art may more completely understand the present invention and the preferred methods by which the same may be carried into effect, the following specific examples are offered.

*Example I*

*Preparation of 1,4-diformyl-2,5-dimethyl piperazine.—* 114.0 g. (1.0 mol) 2,5-dimethyl piperazine is dissolved in 300 ml. of distilled water, filtered, and the filter cake rinsed with 100 ml. of water. 365.0 g. (2.2 mol) chloral hydrate, dissolved in 800 ml. of distilled water, is then added to the solution with shaking and stirring. After 10 minutes, a yellow-brown precipitate is separated by filtration and air-dried; the product weighs approximately 1000 g. After air drying, the product is extracted with chloroform in a Soxhlet extractor. The chloroform is stripped off under reduced pressure with heating via a warm water bath leaving 126 g. of sticky brown crystals. These are washed with a mixture of carbon tetrachloride and chloroform, and the washed portion is left to air dry. The product is recrystallized from ethyl acetate containing about 5 to 40% chloroform which solution, prior to crystallization is treated with about 15 ml. of bone black for 10 minutes then cooled to yield 29.8 g. of orange crystals. After a second recrystallization and decolorization step, the combined product is filtered and dried, resulting in a yellow powder, M.P. 157° to 158.5° C. Preparation of the desired $C_8H_{14}N_2O_2$ is indicated through the following elemental analytical data:

| Element | Actual, Percent by wgt. | Calculated, Percent by Wgt. |
| --- | --- | --- |
| C | 55.8 | 56.5 |
| H | 8.09 | 8.29 |
| N | 16.43 | 16.44 |

The 1,4-diformyl-2,5-dimethyl piperazine is less than 5% soluble in xylene, cyclohexanone and acetone, but is greater than 5% soluble in water.

*Example II*

To evaluate insecticidal activity, a test is carried out whereby adult two-spotted spider mites, *Tetranychus bimaculatus*, maintained on Tendergreen beans under controlled conditions, are transferred from a stock culture by leaf cuttings to uninfested seed leaves of bean plants growing in 2½" pots the day prior to testing.

A formulation (2000 p.p.m., product of Example I, 5% acetone, 0.01% Triton X-155, balance water) is sprayed onto the infested test plants. After 2 days, comparison is made to untreated checks and mortality counts are made showing the product of Example I to be significantly fatal to the spider mites.

*Example III*

Further biological activity is shown in using the bean aphid, *Aphis fabae*, which is cultured on nasturtium plants. Such nasturtium plants are infested with approximately 100 aphids at the time of treatment. The test plants are treated by pouring a formulation (2000 p.p.m., product of Example I, 5% acetone, 0.01% Triton X-155, balance water) on the soil in which the plants are growing at a rate equivalent to 64 lbs./acre. Comparison to untreated checks is made after 24 hours showing the product of Example I to be significantly lethal to the above aphid.

*Example IV*

A tomato disease foliage test is conducted measuring the ability of the product of Example I to protect tomato foliage against infection by the early blight fungus, *Alternari solani*. Tomato plants 5 to 7 inches high of the variety Bonny Best are employed. The plants are sprayed with 100 ml. of test formulations (2000 p.p.m. and 400 p.p.m., product of Example I, 5% acetone, 0.01% Triton X-155, balance water) at 40 pounds air pressure while being rotated on a turntable in a spray chamber. After the spray deposit is dry, the treated plants and comparable untreated controls are sprayed with about 20 ml. of a spore suspension containing approximately 20,000 conidia of *A. solani* per ml. The plants are held at 100% relative humidity for 24 hours at 70° F. to permit spore germination and infection. After 2 to 4 days, lesion counts are made on the three uppermost fully expanded leaves. Data based on the number of lesions obtained on the control plants shows 71% and 21% disease control at the 2000 p.p.m. and 400 p.p.m. concentrations, respectively.

*Example V*

Further fungicidal utility is demonstrated by the ability of the product of Example I to protect tomato plants against the late blight fungus, *Phytophthora infestans*. The method employs tomato plants 5 to 7 inches high of the variety Bonny Best. 100 ml. of the test formulation (2000 p.p.m. and 400 p.p.m., product of Example I, 5% acetone, 0.01% Triton X-155, balance water) is sprayed on the plants at 40 pounds air pressure while the plants are rotated on a turntable in a spray chamber. After the spray deposit is dry, the treated plants and comparable untreated controls are sprayed with about 20 ml. of a spore suspension containing approximately 150,000 sporangi of *P. infestans* per mil. The plants are held at 100% relative humidity for 24 hours at 60° F. to permit spore germination and infection. After 2 to 4 days, lesion counts are made on the three uppermost fully expanded leaves. Comparing the number of lesions on the test plants and control plants show disease control of 71% and 44% at the 2000 p.p.m. and 400 p.p.m. concentrations, respectively.

It is to be understood that although the invention has been described with specific reference to particular embodiments thereof, it is not to be so limited since changes and alterations therein may be made which are within the full intended scope of this invention as defined by the appended claims.

What is claimed is:

1. A method of killing insects which comprises contacting said insects with an insecticidal amount of 1,4-diformyl-2,5-dimethyl piperazine.

2. A method of killing aphids which comprises contacting said aphids with an aphicidal amount of 1,4-diformyl-2,5-dimethyl piperazine.

3. A method of controlling fungus growth which comprises contacting said fungus with a fungicidal amount of 1,4-diformyl-2,5-dimethyl piperazine.

References Cited in the file of this patent

UNITED STATES PATENTS

| | | |
|---|---|---|
| 2,451,645 | Zienty et al. | Oct. 19, 1948 |
| 2,508,652 | Ramsey | May 23, 1950 |
| 2,541,584 | Jacoby | Feb. 13, 1951 |
| 2,545,176 | Swaney et al. | Mar. 13, 1951 |

FOREIGN PATENTS

| | | |
|---|---|---|
| 742,450 | Great Britain | Dec. 30, 1955 |
| 1,094,060 | France | Dec. 1, 1954 |

OTHER REFERENCES

Smith et al.: Jour. Am. Chem. Soc., vol. 70, 1948, p. 4254.

Berichte Deutsche Chemische Gesell., vol. 5, 1872, p. 247.

UNITED STATES PATENT OFFICE
CERTIFICATION OF CORRECTION

Patent No. 2,958,624  November 1, 1960

Russell M. Bimber

It is hereby certified that error appears in the above numbered patent requiring correction and that the said Letters Patent should read as corrected below.

Column 2, lines 3 to 9, the formula should appear as shown below instead of as in the patent:

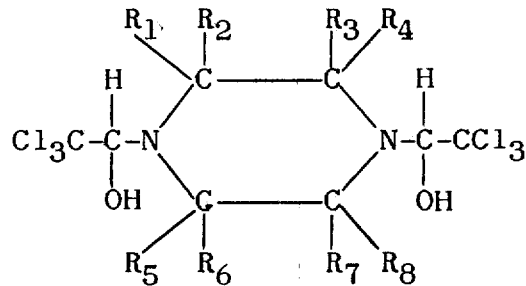

column 4, line 60, for "per mil." read -- per ml. --.

Signed and sealed this 9th day of May 1961.

(SEAL)
Attest:

ERNEST W. SWIDER
Attesting Officer

DAVID L. LADD
Commissioner of Patents